Harold Pilcher
INVENTOR

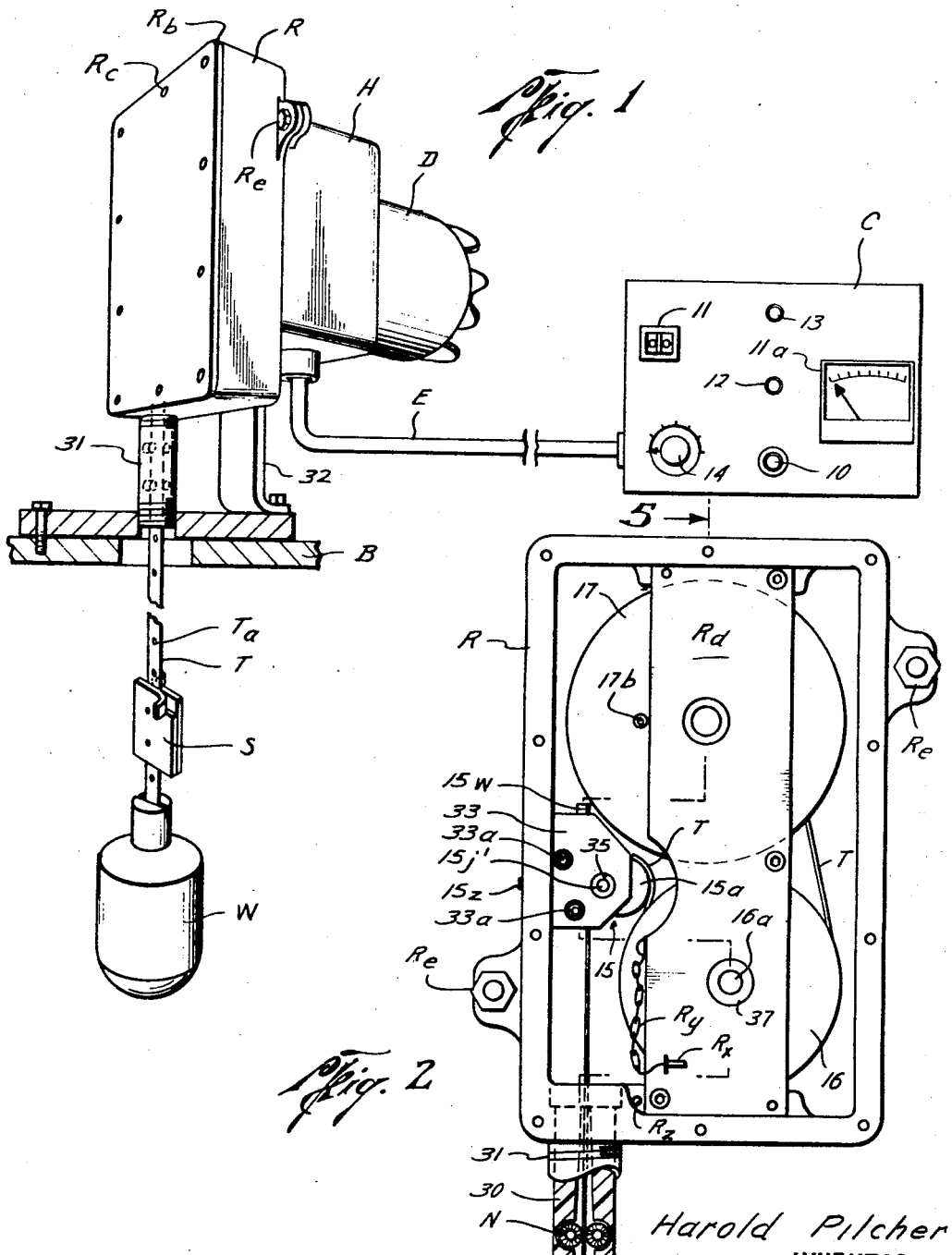

BY
Hayden Pravel Wilson & Matthews
ATTORNEYS

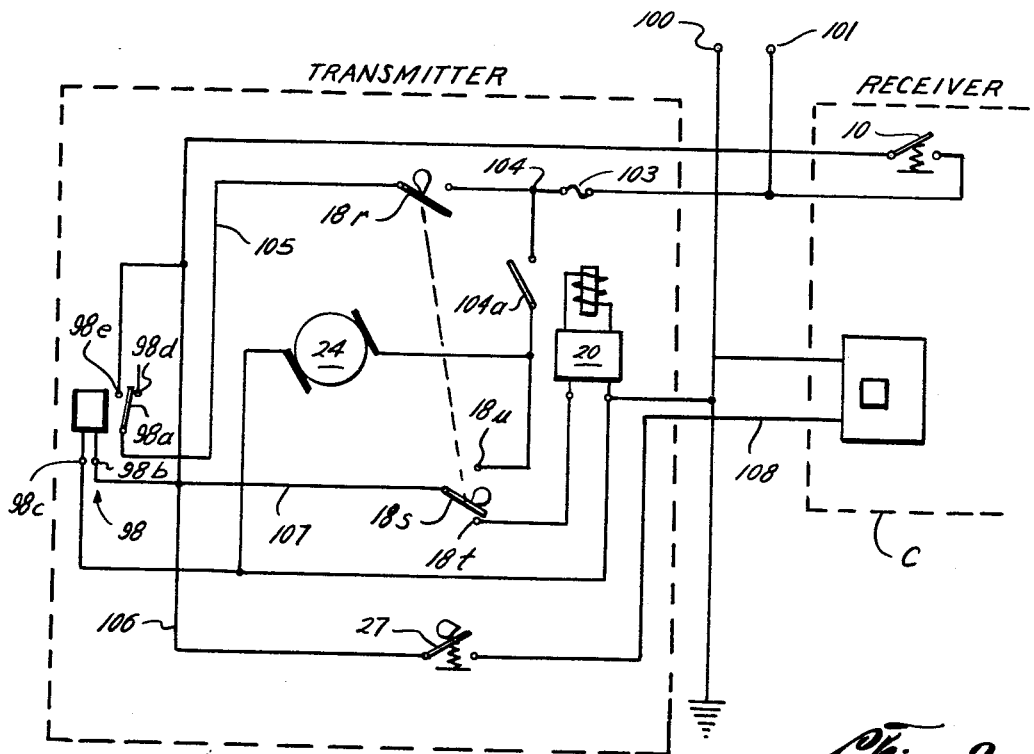
Fig. 8
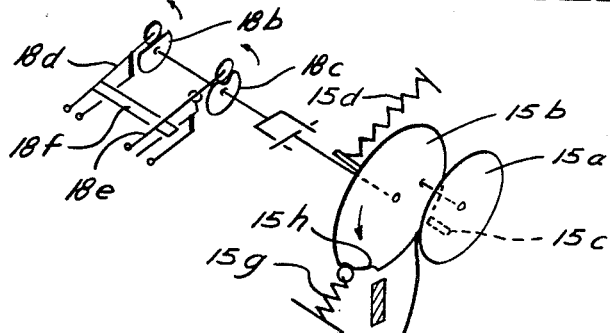
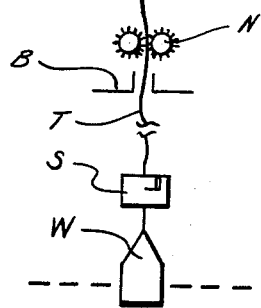
Fig. 3A
Harold Pilcher
INVENTOR
BY
Hayden Pravel Wilson & Matthews
ATTORNEYS

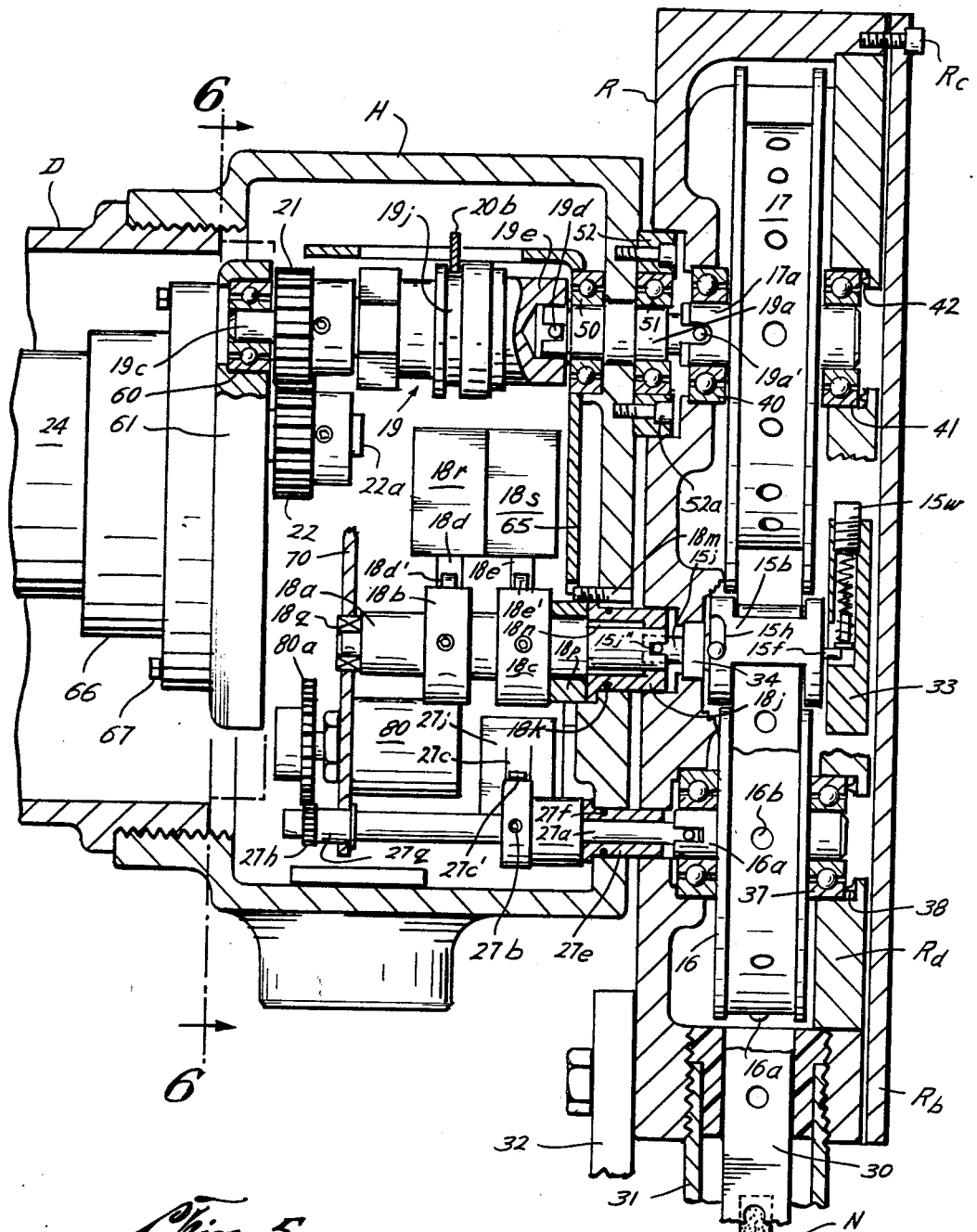

March 17, 1970   H. PILCHER   3,500,546
AUTOMATIC CONTAINER STORAGE LEVEL CONTAINER
Filed Sept. 20, 1967   5 Sheets-Sheet 5

Harold Pilcher
INVENTOR

BY
Hayden Pravel Wilson & Matthews
ATTORNEYS

United States Patent Office 3,500,546
Patented Mar. 17, 1970

3,500,546
AUTOMATIC CONTAINER STORAGE
LEVEL CONTAINER
Harold Pilcher, 4418 Lido Lane,
Houston, Tex. 77018
Filed Sept. 20, 1967, Ser. No. 669,214
Int. Cl. G01b 3/10
U.S. Cl. 33—126.6        3 Claims

ABSTRACT OF THE DISCLOSURE

An automatic apparatus for determining the quantity of material stored in containers. A weight secured to the end of a flexible measuring tape wound on a storage reel draws the tape over a rotatable measuring sprocket as it falls by gravity to produce an electrical pulse with each revolution of the sprocket which is counted by an electronic counter to produce a digital reading corresponding to the length of tape removed from the storage reel. An idler mechanism reacts to changes in the tension of the tape to activate an electric motor when the weight meets an obstruction to rewind the tape.

BACKGROUND OF THE INVENTION

Field of the invention

The present invention relates generally to the field of measurement of quantities stored in containers. Specifically, the present invention relates to the automatic determination of the level of chemicals or other materials remaining in bins or containers. Chemicals as well as other products and commodities are often stored in large bulk tanks. For example, pellets of polyethylene or polypropylene are stored in large bins pending future use. Similarly, grains, cement, and liquids are often stored in large tanks or bins. The present invention is designed to provide a means for automatically determining the level in such storage containers.

Description of the prior art

The measurement of content level of large bins and tanks has usually required that personnel scale each of the containers and drop a measuring tape with a weight thereon into its interior and when the weight hits bottom, the operator is supposed to visually note the depth and then rewind the tape. The manual measurement of the content level of large containers is understandably slow, dangerous, and inaccurate. The problem becomes even more apparent in the larger storage facilities where information regarding the level of a large quantity of containers may be required.

Another device employs a motor to lower the tape and weight into the container and when the weight hits bottom or the level in the container, the motor is reversed and the tape withdrawn.

Still another device is lowered against spring tension acting on the tape and weight when the weight touches bottom, or reaches the level of contents in the container, a predetermined time lapse occurs before the tape is rewound by motor.

The present invention overcomes the problems in that it provides a device wherein the tape and weight are permitted to fall by gravity into a container. As soon as slack occurs in the tape when it hits bottom, or reaches the level of the material in the container, the tape is rewound. As the tape is initially lowered into the container, the distance to bottom or to the level of material in the counter is electronically measured. Therefore, a more positive acting and simpler device is provided which yields more accurate results than that heretofore possible.

SUMMARY OF THE INVENTION

The automatic container storage level detector of the present invention is an explosion proof, modular system with easily removable components for automatically providing a directly readable measurement in a central control room of the depth of the contents of a plurality of storage containers.

A tension sensitive mechanism in the system monitors the tension in a measuring tape to detect the depth level of the material held in the container. The tape rotates a measuring sprocket as it is unwound under the gravity influence of a falling weight connected to its end to produce electrical pulses which are counted to provide a digital readout. The presence of slack in the tape is sensed by the idler when the weight encounters the bottom of the container or the top of the material stored in the container. The idler energizes an electric motor when the tape becomes slack which automatically rewinds the tape and thereafter an increase in the tension of the tape is detected by the idler to turn off the motor. An entire storage area may be monitored in a central control room with a single console which may sequentially be connected to any desired number of tanks.

BRIEF DESCRIPTION OF THE DRAWINGS

FIG. 1 of the drawings is an elevation illustrating the apparatus of the present invention;

FIG. 2 is an elevation illustrating the contents of the reel box of the present invention;

FIG. 3A of the drawings is a schematic representation also illustrating the general operation of the system of the present invention;

FIG. 5 is a partial cross-section through the reel box, electrical housing, and motor of the present invention taken along the broken line 5—5 of FIG. 2. Portions of the electrical components of the present invention have been omitted from FIG. 5 for added clarity in describing the mechanical components;

FIG. 8 is a schematic digram of the electrical circuitry of the apparatus of the present invention.

DESCRIPTION OF THE PREFERRED EMBODIMENT

Figure 3:
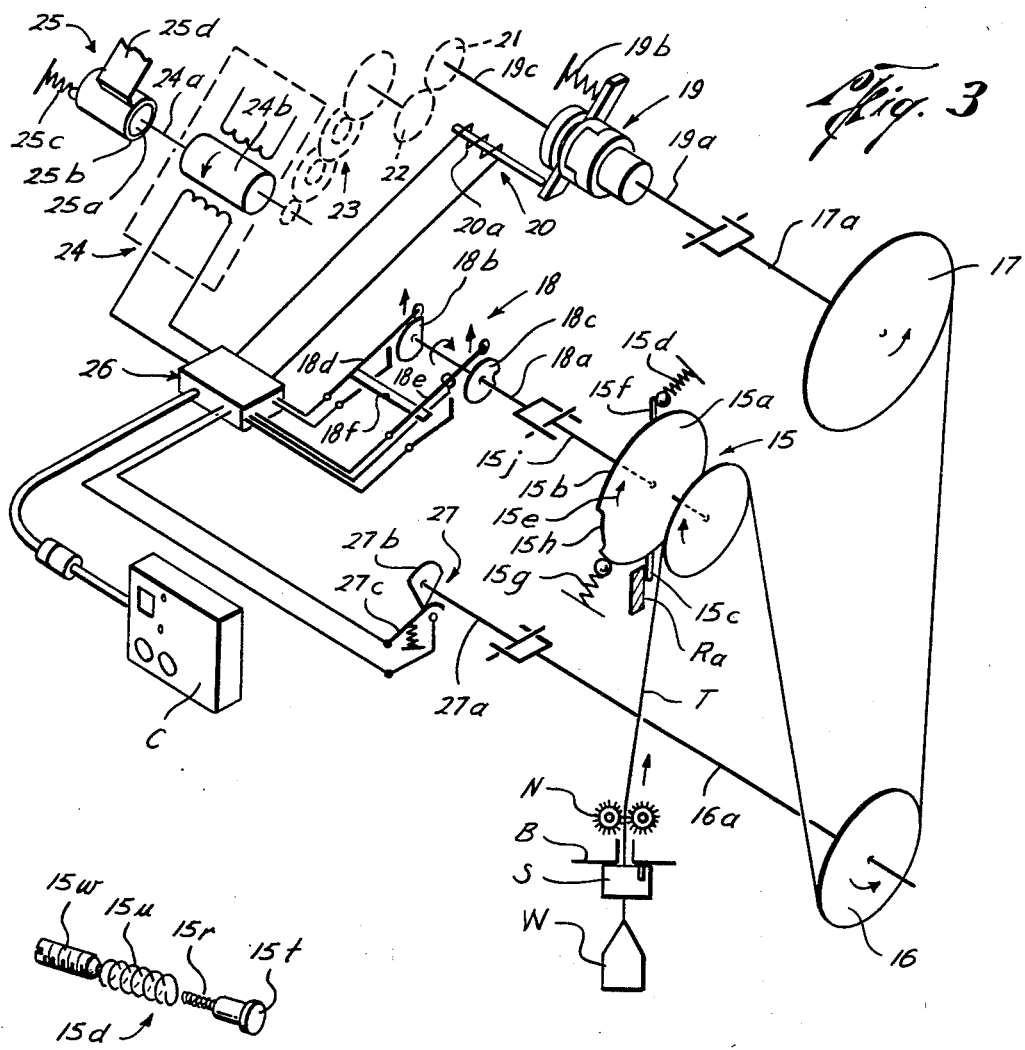
FIG. 3 of the drawings is a schematic representation of the general operation of the system of the present invention.

With reference to FIG. 1 of the drawings, it may be seen that the level detector of the present invention includes a weight W secured to a nylon measuring tape T. The tape T extends into a reel box R which is mounted at the top of a bin or container B. The reel box R is secured to an electrical housing H which in turn is connected to a motor cover D. An electrical conduit E extends from the housing H to a remotely located control and data readout console C.

In a typical application, the weight W is released causing the tape T to unreel as the weight falls by gravity into the bin B. When the weight W encounters either the bottom of the bin B or the top of the material stored in the bin B, a depth reading is automatically produced at the console C to provide an indication of the amount of material remaining in the bin.

The general principle of operation of the level detector of the present invention may be described briefly as folows. When a depth level measurement is desired, a start button 10 on the console C is depressed momentarily to actuate a solenoid in the electrical housing H which in turn disengages a clutch to release a windup reel in the reel housing R. The weight of W causes the tape T to unwind from the reel. A mechanism located in the housing H produces an electrical pulse with each complete revolution of a measuring sprocket contained in the box which is rotated by the movement of the tape T. The pulse is electrically relayed to a pulse counter in the console C which produces a digital readout at a window 11 corresponding to the number of elapsed revolutions of the measuring sprocket. When the weight W encounters the bottom of the bin or the top of the stored material, the tension in the tape T is reduced. The reduction in tape tension is detected by an idler mechanism located in the reel box R which activates switches in the electrical housing H which in turn deactivate the clutch solenoid and energize an electric motor. The tape T is then automatically rewound by the electric motor which is located under the motor covering D. When the tape is fully rewound, a tape stop S engages the upper covering of the bin B and the tension in the tape T begins to increase. This increase in tension is detected by the idler mechanism causing it to disengage the switches in the housing H to turn off the electric motor.

After the reading in the window 11 has been observed, reset button 12 on the console C is depressed to return the digital reading to zero or to the height of the tank, depending on whether the distance from the top or the bottom of the tank is desired. If desired, the electrical system may thereafter be turned completely off with an on-off switch such as the switch 13 on the console C. When another reading is desired, the switch 13 is turned to on and the start button 10 is depressed momentarily to repeat the foregoing cycle.

For purposes of description, the assembly consisting of the weight W, the tape T, the reel box R, the electrical housing H, and the motor cover D is referred to herein as a "transmitter," while the control and data readout console C is referred to herein as a "receiver." With reference to the foregoing definitions, it should be noted that while only a single transmitter has been illustrated in FIG. 1 of the drawings, any number of transmitters may be connected into a single receiver console C. For example, a typical installation contains approximately twenty transmitters which are disposed over twenty separate bins. Each of the twenty transmitters is connected into a single receiver console C which is located in a central control area. An appropriate control such as the multiple position switch 14 is provided on the centrally located console C to permit the selection of any one of the twenty transmitters for a reading.

The operation of the automatic level detector of the present invention may best be described with reference to the schematic representation in FIGS. 3 and 3A of the drawings. As illustrated in FIG. 3, the tape T moves through two opposed rotatable cleaning brushes W having nylon bristles which prevent foreign matter from accumulating in the registration holes Ta formed in the tape T. Also contained in the reel box R is an idler mechanism indicated generally at 15. The tape T is threaded through the idler mechanism 15 around an idler cylinder 15a where it then extends to a measuring sprocket 16 contained in the reel box R and a storage reel 17 also contained within the reel box R.

The rotatable idler cylinder 15a is eccentrically mounted on an idler yoke 15b. The yoke 15b is limited to move through only a partial revolution by the action of a stop pin 15c which projects from the yoke. At the extreme end of the yoke's rotation, the pin 15c meets a stop surface Ra formed in the reel box R. The idler yoke 15b is biased against the direction of the arrow 15e by a low limit spring assembly 15d which bears against a second pin 15f projecting from the yoke 15b. A second high limit spring assembly 15g which usually bears against the detent slot 15h of the yoke 15b is used to increase the force required to rotate the yoke over its last degree or two of rotation by requiring that before this final rotation is made the end of the spring assembly must be forced out of the detent slot by compressing the spring assembly.

The idler mechanism 15 is mounted in the reel box R by means of a shaft 15j which conveys the movements of the idler yoke into the electrical housing H to a tension shaft 18a in a switch assembly 18. Two cam elements 18b and 18c are rigidly mounted on the shaft 18a so that they rotate with the shaft. Two switch actuating levers 18d and 18e ride against the cam surfaces of the elements 18b and 18c, respectively. A mechanical linkage 18f is rigidly secured to the lever 18d and extends under the lever 18e.

When the lever 18d is not on the flat surface of the cam element 18b, the linkage 18f engages the switch lever 18e to move it into one of its switching positions. When, however, the lever 18d is riding on the flat portion of the element 18b, the linkage 18f falls free of the lever 18e to permit the lever 18e to assume its second switching position which occurs when the lever engages the indented cam surface of the element 18c.

The storage reel 17 is rotatably mounted on a shaft 17a which extends through the reel box R and into the electrical housing H where it engages the drive-side shaft 19a of a clutch assembly 19. The clutch assembly is biased by a spring 19b so that it is normally engaged with the motor-side shaft 19c of the clutch assembly. A mechanical linkage 19d is connected to the clutch assembly to declutch the assembly when a solenoid 20 is drawn in.

The motor-side, clutch shaft 19c is secured to a gear wheel 21 which is driven by a second gear wheel 22. The gear wheel 22 is driven by the motor gear arrangement indicated generally at 23 which in turn is powered by the electric motor indicated generally at 24. The armature shaft 24a of the motor 24 is connected to an overrunning clutch assembly indicated generally at 25.

When the motor 24 is running and its armature 24b is turning in the direction of the arrow, an inner clutch member 25a of the clutch 25 is free to turn with little resistance within an outer clutch sleeve 25b. However, when the direction of rotation is reversed, the outer sleeve 25b is engaged by the inner clutch member 25a causing the outer sleeve to rotate against a sliding frictional force imposed by an adjustable damping assembly 25c. A wiper 25d rides against the sleeve 25b to prevent it from migrating when the motor 24 is running.

The armature winding 24c of the electric motor 24 and the coil 20a of the solenoid 20 are connected to the control circuitry indicated generally at 26. The electrical leads from both the switch levers 18d and 18e and their corresponding switching terminals are also connected into the circuitry 26. A plural conductor electrical line connects the circuitry 26 with the console C.

The measuring sprocket 16 is rotatably mounted on a sprocket shaft 16a which extends through the reel box R and into the electrical housing H where its motion is imparted to a measuring shaft 27a connected to a measuring assembly indicated generally at 27. A cam element 27b is rigidly secured to the shaft 27a and on each revolution of the shaft 27a, the element 27b activates a switch 27c to create an electrical pulse. The electrical leads from the switch 27c are also connected into the circuitry 26.

A complete cycle of the system of FIGS. 3 and 3A will now be described. The start button 10 on the console C is depressed causing the circuitry 26 to energize the solenoid 20 which overcomes the bias of the spring 19b to disengage the clutch 19. When the clutch 19 has been disengaged, the reel 17 is free to rotate, allowing the tape T to be unreeled as the weight W falls. The movement of the tape rotates the sprocket 16 with each complete rotation producing an electrical pulse by the closing of the switch 27a in the measuring assembly 27. The pulses are conducted to the circuitry 26 which relays them to the console C to produce a digital readout at the window 11 corresponding to the number of pulses which are received.

The initial release of the tension in the tape T also permits the biasing effect of the spring 15d to rotate the idler yoke 15b sufficiently to permit the high limit spring assembly 15g to spring back into the detent slot 15h. While the assembly 15g is in the detent slot 15h, the idler yoke 15b is relatively sensitive to changes in the tension of the tape T. During the period that the tape T is unreeling under the constant force of the falling weight W, the idler yoke 15b assumes a position of equilibrium established by the force of the weight and the counteracting force of the spring assembly 15d and the preloading of the sprocket 16 and reel 17, as will be described hereinafter.

The initial rotation of the yoke 15b is also transmitted to the switch assembly 18 to energize a holding relay when the lever arm 18d engages the flat surface of the cam element 18b which maintains the disengagement of the clutch 19 after the start button 10 is released.

With reference to FIG. 3A of the drawings, when the weight W strikes the bottom of the bin or the top of the material which is stored in the bin, the tension in the tape T is reduced to almost zero. The biasing force of the spring 15d rotates the idler yoke 15b to its extreme low limit position illustrated in FIG. 3A of the drawings. When the yoke 15b assumes this position, the lever 18e of the switch assembly 18 drops into the indented portion of the surface of the cam element 18c to throw a switch which in turn energizes the electric motor 24 and simultaneously de-energizes the solenoid 20 which thereby permits the clutch 19 to re-engage.

The rotation of the motor 24 is transmitted through the gear arrangement 23, the gear teeth 22 and 21 and the engaged clutch 19 to rewind the tape T on the reel 17. The tension in the tape T during the majority of the rewinding procedure is not sufficient to force the high limit assembly 15b from the detent slot 15h. However, when the tape stop S reaches the top of the bin B as illustrated in FIG. 3, continued rotation of the motor 24 forces the tension in the tape to increase rapidly causing the high limit assembly to spring out of the slot 15h as the yoke 15b is rotated to the position where the pin 15c engages the stop Ra. When this latter position is reached, the lever arm 18b of the switch assembly 18 is rotated off the flat portion of the cam member 18b to open the high limit switch and release the holding relay. Simultaneously, the linkage 18f lifts the switch lever arm 18e to turn off the motor 24 and to prepare the system for a subsequent immediate release of the clutch 20 by energizing the solenoid 20 on the next cycle.

The relatively large tension force imposed in the tape T just before stopping the motor 24 tends to rotate the reel 17a in the reverse direction to the direction of winding when the motor is stopped. This causes the rotor 24b of the motor 24 to rotate in the reverse direction which causes the clutch 25 to engage and rotate the outer clutch sleeve 25b. The friction imposed by the damping assembly 25c opposes movement of the sleeve 25b to brake the reverse rotation of the rotor 24b. The tension in the tape is thereby eased slightly, but the weight is prevented from slowly creeping down from its elevated position between readings.

FIGS. 2, 4, 5, 6, and 7 illustrate the preferred construction of certain of the components of the automatic level detector of the present invention. While the illustrated structures and mechanism are those preferred for the invention, it will be apparent to those having ordinary skill in the art that various modifications and substitutions may be employed without departing from the scope of the invention.

FIG. 2 of the drawings illustrates an elevational view of the reel box R with the reel box cover Rb illustrated in FIG. 1 being removed. With reference to both FIGS. 1 and 2, the cover Rb is removably affixed to the box R by means of the bolts Rc or by any other suitable means. As best illustrated in FIGS. 2 and 5, a cylindrical tape guide 30 with an externally threaded flange is threadedly engaged in a threaded opening extending through a side wall of the reel box R. A threaded metal nipple 31 encircles the shank of the guide 30 and is threadedly engaged in the threaded wall opening of the box R in abutting relationship with the flange of the tape guide 30. The tape guide 30 is preferably constructed of nylon or other suitable material in the form of a longitudinally slotted cylindrical body with a threaded flange at one end. The slot in the guide 30 aligns the tape T for proper passage through the idler mechanism 15. Each of the two body portions of the slotted guide 30 contains rotatable cylindrical nylon brushes N which, as noted hereinbefore, are employed to clean the register holes Ta in the tape T. The nipple 31 is employed for the purpose of containing the tape guide 30 and the brushes W and also co-operates with a mounting bracket 32 to provide support for mounting the invention in position above the bin B.

The tape T extends from the tape guide 30 through the idler mechanism 15. The structure of the idler mechanism 15 is illustrated in detail in FIG. 4 of the drawings. The idler 15 includes the idler yoke 15b having spaced upper and lower circular mounting portions. The central shaft of the idler cylinder 15a is rotatably mounted eccentrically between the spaced circular mounting portions of the yoke 15b. The idler drive shaft 15j is rigidly affixed to the center of the lower yoke portion while a short mounting shaft 15j' is affixed to the center of the upper yoke portion to provide concentric mounting of the yoke. A fixed pin 15j'' is disposed at the lower end of the shaft 15j to impart the movement of the yoke 15b to the shaft 18a.

Figure 4:
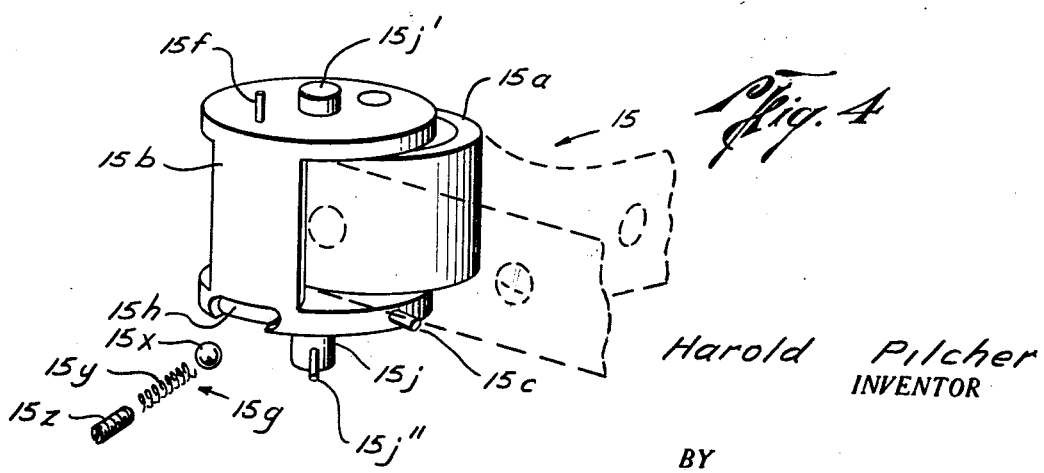
FIG. 4 is a detailed illustration of the idler mechanism employed in the present invention.

As best illustrated in FIG. 4 of the drawings, the low limit bias spring assembly 15d includes a brass spring button 15t, two springs 15u and 15v, and a set screw 15w. The spring 15u encircles the smaller diameter, shorter length spring 15v. The buttom 15t of the spring assembly 15d acts against the idler yoke pin 15f with a force which may be adjusted by the setting of the set screw 15w. The amount of tension required in the tape T to rotate the idler yoke 15b into the position illustrated in FIG. 3A of the drawings is determined by the adjustment of the set screw 15w. The force exerted by the set screw 15w increases rapidly when the inner spring member 15v is engaged so that only a small amount of movement of the screw 15w exerts a relatively large force against the pin 15f.

With reference to FIGS. 2, 3, and 5, it may be seen that the spring assembly 15d is carried in an idler support 33 which is mounted by bolts 33a or other suitable means in the reel box R. The high limit spring assembly 15g includes a steel ball 15x, a coil spring 15y, and a set screw 15z. As illustrated in FIG. 2 of the drawings, the set screw 15z is threaded into a side wall of the reel box R. The high limit assembly 15g is used to adjust the force required to slip the ball 15x out of the detent slot 15h formed in the idler yoke 15b as was previously described with respect to the schematic system illustrated in FIG. 3. The setting of the assembly 15g also co-operates in determining the amount of tension released in the tape T after the motor 24 has been turned off. With appropriate adjustment of the assemblies 15d and 15g, various false readings may be rejected and desired situations may be detected. For example, the initial slack produced by overtravel or initial release of the reel 17. Similarly, the initial striking of a slanted bottom may be desired and appropriate adjustment may be made to produce a reading.

As illustrated in FIG. 5 of the drawings, the drive shaft 15j of the idler yoke 15b is mounted in a stainless steel, double-sealed ball bearing 34 carried in the reel box R. With reference to FIG. 2, the mounting shaft 15j' of the yoke 15b is mounted in a second stainless steel double sealed ball bearing 35 carried in the idler support 33.

With reference to FIGS. 2 and 5 of the drawings, the tape T leaves the idler cylinder 15a and partially encircles the measuring sprocket 16. The sprocket 16 is provided with multiple, spaced, radially extending registration pins 15b which engage the correspondingly spaced registration holes Ta formed in the tape T. In the preferred embodiment, the dimension of the sprocket 16 is such that one full revolution equals one foot. This relationship may, however, be altered with proper adjustment in the counting circuit. The use of registering holes and pins assures positive rotation of the measuring sprocket 16 with the movement of the tape T. The sprocket shaft 16a which is secured to the sprocket 16 by means of a set screw (not illustrated) or other suitable means is mounted in two double-sealed ball bearings 36 and 37. The bearing 36 is preferably secured by a pressed fit in an appropriate mounting socket formed in the reel box R while the bearing 37 is mounted by a sliding fit in a mounting socket formed in a reel mount support Rd. The sprockets rotational mounting is spring loaded by a wave spring washer 38 which is disposed between the outer race of the bearing 37 and the support Rd. The spring loading of the sprocket 16 assists in providing the proper tape tension during the unreeling of the tape T and in inhibiting the inertially induced tendency of the sprocket 6 to overrun when the fall of the weight W is suddenly halted.

The end of the tape T is fastened to the hub of the storage reel 17 in any manner suitable to cause the tape to be wound onto the reel when the motor 24 is running in its forward direction. One suitable arrangement includes the use of a tape clamp (not illustrated) in the hub of the reel 17 with the clamp being secured by the socket head cap screw 17b illustrated in FIG. 2 of the drawings. The reel shaft 17a which is secured to the reel 17 by a set screw (not illustrated) or other suitable means is mounted in two double-sealed ball bearings 40 and 41. The bearing 40 is mounted in a press fit in a mounting socket in the reel box R while the bearing 41 is mounted in a sliding fit in a mounting socket formed in the reel support Rd. As with the sprocket 16, the sliding fit of one bearing permits spring loading by a wave washer such as the washer 42 disposed between the outer race of the bearing 41 and the reel support Rd to cause tension in the tape during unreeling and to prevent overrunning of the reel 17 when the weight is stopped. The spring loading also prevents the tendency of the reels to overrun when the clutch 19 is initially released.

As best illustrated by FIG. 5 of the drawings, the reel box R and the electrical housing H, along with their respective contents, are linked mechanically by the separable connections formed with the reel shaft 17a, the idler drive shaft 15j, and the sprocket shaft 16a. To separate the reel box R and the housing H, it is only necessary to first remove any connecting bolts such as the tie bolt Re illustrated in FIGS. 1 and 2 and then to slide the two components apart. The separability feature increases accessibility to mechanism in both components and substantially reduces construction and repair time. As will be apparent hereinafter, the motor 24 and the motor gear assembly 23 are also easily separated from the system.

With reference to FIG. 5, the variable diameter drive shaft 19a of the clutch assembly 19 extends through the bottom of the electrical housing H where it is mounted between two double-sealed ball bearings 50 and 51. The bearing 51 is mounted on the outside of the housing H by a boss 52 which in turn is secured within a small mounting depression in the bottom of the housing by socket head cap screws 52a or other suitable means. The bearing 50 is mounted by a press fit into an appropriate mounting socket inside the housing H. The rotation of the shaft 19a is imparted to the reel 17 by the action of a pin 19a' acting against a slot in the end of the reel shaft 17a. The other end of the shaft 19a is slotted to receive a pin 19d formed in the body of the clutch assembly 19.

A pin Rx is secured to a chain Ry which in turn is secured to the plate Rd. The pin Rx may be inserted in a hole Ta in the tape T inside the reel box R to prevent the tape from moving through the tape guide 30 under the influence of the weight W when the system components are disassembled for replacement or repair. When not in use, the pin Rx is stored in a hole Rz in the box R.

Details of the construction of the clutch assembly 19 may best be illustrated by reference to FIGS. 6 and 7 of the drawings. The pin 19d is carried in the flanged head of an inner clutch body 19e having a cylindrical shank which is provided with multiple, circumferentially spaced semispherical depressions 19f. The depression 19f are designed to co-operate with the metal balls 19g carried in tapered sockets formed in an outer clutch body 19h. The sockets in the outer body 19h are tapered to retain the balls while permitting a portion of the balls to extend into the central bore of the outer body where they engage the depressions 19f of the inner clutch body 19e.

An actuating sleeve 19j is telescoped over the outer body 19h for the purpose of containing the balls 19g and to drive them into engagement with the depressions 19f of the inner clutch body 19e. A retainer 19k secured to the bottom of the inner clutch body 19h by a spring clip 19m limits the downward axial movement of the 19j. A coil spring 19n which encircles the member 19h bears against a shoulder formed on the member 19h and an inner shoulder formed on the sleeve 19j to bias the sleeve against the retainer 19k. In this latter position, the inner surface of a reduced diameter bore in the sleeve 19j bears against the balls 19g to force them into the depressions 19f. While the balls are thus engaged, they lock the outer clutch body 19h causing it to rotate with the inner clutch body 19e.

When energized, the two solenoids 20 act through a mechanical linkage 20b to lift the sleeve 19j against the biasing force of the spring 19n. In this position, the balls 19g are free to move partially out of their tapered sockets to permit the inner clutch body 19e to rotate independently of the outer clutch body 19h. When the solenoid 20 is de-energized, the biasing spring 19n snaps the activating collar back into the position illustrated in FIG. 7 to re-engage the inner clutch body 19e.

A metal ball 19p which acts as a thrust bearing is disposed between a conical depression formed in one axial end surface of the inner clutch body 19e and a similar depression formed at the axial end of a removable body 19q. The body 19q is secured by a set screw 19r within the central bore of the outer clutch body 19h.

A gear wheel 21 is removably secured to the shaft 19c of the clutch assembly 19 by means of a set screw (not illustrated) or other suitable means. The size of the gear wheel 21 may be altered to obtain any desired lifting force or speed. The shaft 19c of the clutch assembly is mounted in a double-sealed ball bearing 60 secured by a press fit in an appropriate mounting socket formed in a motor mount plate 61. The motor mount plate is attached to three standoffs 62, 63, and 64 illustrated in FIG. 6 of the drawings. The standoffs extend upwardly from a generally L-shaped mounting plate 65 secured to the floor of the electrical housing H. The standoffs 62, 63, and 64 support the motor mount plate above the components contained within the housing H.

With reference to FIG. 5 of the drawings, a drive shaft 22a extends through the motor mount plate 61 and is secured to the removable gear wheel 22 which is in meshing engagement with the gear wheel 21. The other end of the shaft 22a is connected into the gear assembly 23 contained in a gear housing 66. The gear housing 66 is secured to the mounting plate 61 by the bolts 67 or other suitable means. The motor 24 is mounted on the gear housing 66 with the motor armature 24b connected to the gear assembly 23 in the manner described previously.

Again with reference specifically to FIG. 5, the movement of the idler yoke 15b is transmitted to the variable diameter tension shaft 18a to which are secured the two cam elements 18b and 18c. The two cam elements 18b and 18c are removably secured to the shaft 18a by means of appropriate set screws. The shaft 18a extends through a bushing 18j having an O-ring 18k. The bushing 18j is firmly locked in the floor of the housing H by a set screw 18m or other suitable means.

The bushing 18j contains roller bearings 18n disposed in the annulus formed between the shaft 18a and the bore of the bushing. A control collar 18p is disposed about the shaft 18a between the cam element 18c and the flanged end of the bushing 18j. The other end of the shaft 18a is mounted in a stainless steel, double-sealed ball bearing 18q. The bearing 18q is mounted in a press fit into an appropriate opening in a mounting plate 70. As best illustrated in FIG. 6, the mounting plate 70 is also supported by the standoffs 63 and 64.

With reference to FIG. 5, the measuring shaft 27a extends through a bushing 27e formed of brass or other suitable material. An O-ring 27f is provided in the outer body of the bushing 27e to provide a tight, leakproof fit with the housing H. The motion of the sprocket 16 is transmitted to the cam element 27b by the action of the slotted shaft 16a bearing against a pin 27a' in the shaft 27a. The cam element 27a is removably secured to the measuring shaft 27a by means of a set screw or other suitable fastener.

The shaft 27a extends through an oiled bushing 27g mounted in the plate 70. A gear wheel 27h is removably secured to the shaft 27a for the purpose of driving a larger gear wheel 80a attached to the shaft of a potentiometer 80.

The potentiometer 80 is employed where an analog readout is desired. A movable pointer in the window on the console C indicates the depth reading which has an analog relationship to the voltage output of the potentiometer 80. The potentiometer may be employed in addition to the digital system or it may be employed alone.

As is well known in the art, the potentiometer output voltage is varied by rotation of the gear wheel 80a which moves an electrical wiper across an appropriate electrical winding. The electrical resistance and the number of windings of the potentiometer 80 may be varied to correspond to the vertical depth which is to be measured. As the weight W is falling, the wiper is advanced to increase the voltage output of the potentiometer 80 which produces an increasing movement of the voltage sensitive pointer in the window 11a. The voltage is decreased when the direction of rotation of the gear wheel 80a is reversed as the tape T is rewound.

Figure 6:
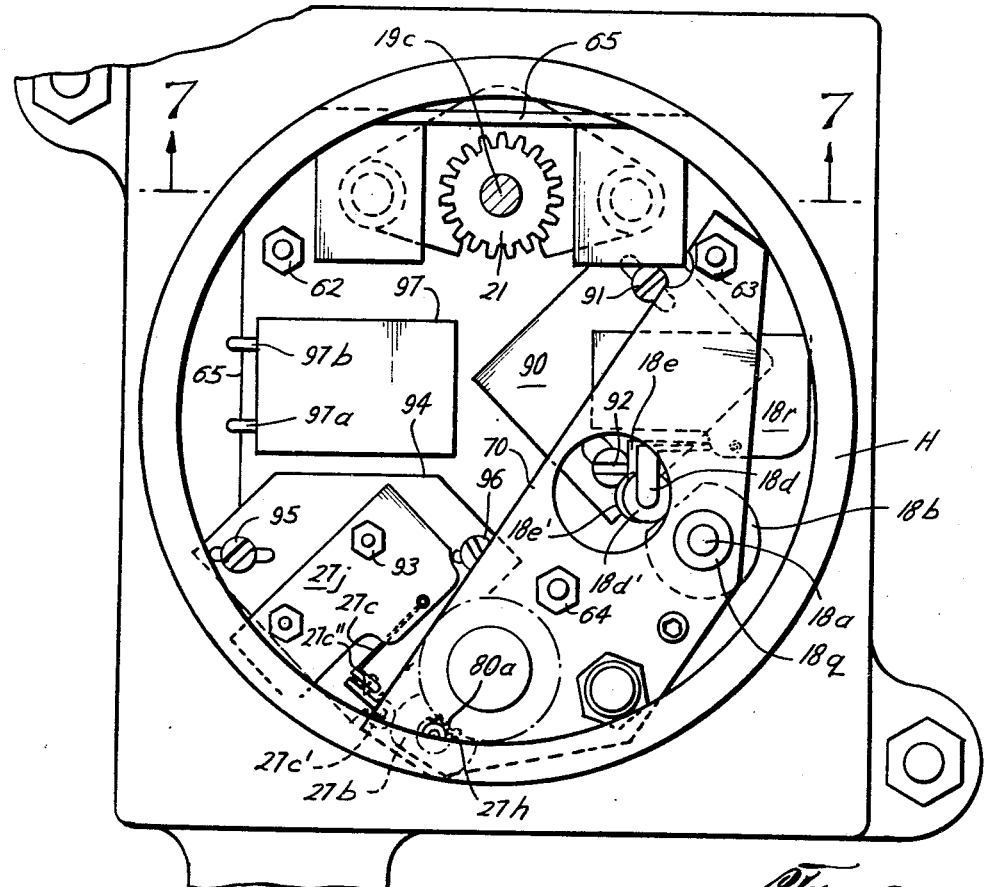
FIG. 6 is a sectional view of the apparatus of the present invention taken along the line 6—6 of FIG. 5.
Figure 7:
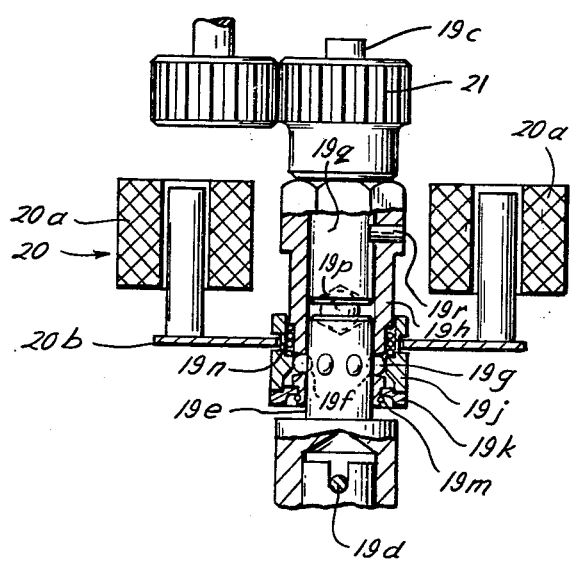
FIG. 7 is an enlarged view, partially in section, of a clutch mechanism employed in the present invention.

With reference to FIGS. 5 and 6, the switch lever arms 18d, 18e, and 27c are provided with rollers 18d', 18e', and 27c', respectively, which ride against their corresponding cam element. The three lever arms are connected to appropriate switching mechanisms 27j, 18r, and 18s. The roller 27c' is mounted on the arm 27c by a hinged connection 27c''. The connection 27c'' bends at its hinge point when the cam element 27b is rotating in the reverse direction to prevent any pulsing while the tape T is being rewound. The tail of the connection prevents the hinging action when the cam element 27b is rotating in the forward direction to activate the switching mechanism 27j and produce a pulse.

The high and low limit switches 18r and 18s, respectively, are mounted on a common adjusting plate 90 which is secured to the bracket 65 by two metal screws 91 and 92. The screws 91 and 92 extend through slots in the plate 90 to permit adjustment of the plate for providing proper positioning of the switch arms 18d and 18e on the cam elements 18b and 18c.

The measuring switch 27j is secured by bolts 93 to a second plate 94 which is adjustably secured by screws 95 and 96 extending through slots in the plate to the bracket 65. The plate 94 may also be adjusted to provide proper positioning of the arm 27c against the cam element 27b.

A relay housing 97 which protects a relay 98 is also secured to the bracket 65. Terminals 97a and 97b extend from the housing 97 to provide electrical connection with external conductors (not illustrated).

The motor 24 is enclosed by the removable motor cover D which is threadedly engaged in the top of the housing H for ease of removal in the event repair or replacement of any of the components is required.

With reference to FIG. 8, the electrical components of the system are energized by a conventional alternating current power source applied to the input terminals 100 and 101. A current sensitive circuit breaker 103 is provided in the input line to prevent damage to the system components in the event of an overload. The circuit breaker 103 is connected to a circuit node 104 which in turn is connected to the high limit switch 18r and an override or jog switch 104a. The switch 18r is connected by a line 105 to the movable switching terminal 98a of the relay switch 98. One control terminal 98b of the relay is connected to the input terminal 101 through the start switch 10 in the console C while the other control terminal 98c of the relay is connected to ground. The movable switching contact 98a of the relay 98 moves between two fixed switch contacts 98d and 98e. In the absence of a potential difference across the relay control terminals 98c and 98d, the movable contact 98a engages the open contact 98d. When a potential exists across the control terminals, the contact 98a is drawn into electrical engagement with the fixed contact 98e which is electrically connected to the line 106.

The low limit switch 18s is connected electrically to the line 106 by a conductor 107. When the high limit switch is open, the mechanical linkage with the low limit switch 18s engages the movable switching contact with a fixed contact 18t electrically connected to the solenoid 20. When the tape T is slack, the movable switching contact of the low limit switch 18s engages a fixed contact 18u electrically connected to the motor 24. The motor 24 and the solenoid 20 are connected to ground to complete their circuits. The measuring switch 27 is connected between the line 106 and the console C by a line 108 to complete the representative circuitry employed in the system.

The system of FIG. 8 operates as follows. The start switch 10 is depressed momentarily to connect the potential at the input terminal 101 with the control terminal 98b of the relay 98. Since the terminal 98c is connected to ground, a potential difference equal to the line voltage is produced across the relay input terminals.

This potential difference causes the movable switch contact 98c to move into electrical engagement with the fixed contact 98e. The line voltage on the line 106 is also transmitted to the solenoid 20 through the low limit switch 18s to draw in the solenoid and release the storage reel 17. The release of the reel 17 permits the high limit switch 18r to close. The start switch 10 returns to its open position when released and the line current is thereafter transmitted through the high limit switch 18r and the relay 98 to the line 106 which prevents the relay 98 from being de-energized by the absence of a potential on the line 106. Each revolution of the measuring sprocket momentarily closes the switch 27 which transmits a pulse to the conventional electronic counter on the console C along the line 108.

When the weight W reaches bottom, the lower limit switch 18s moves into engagement with the contact 18u to energize the motor 24. The simultaneous de-energizing of the solenoid 20 causes the reel 17 to be mechanically re-engaged with the motor 24 to wind up the tape T. When the tape stop S reaches the upper end of its travel, the high limit switch 18r is opened to de-energize the motor 24 and the relay 98. The opening of the high limit switch 18r simultaneously moves the low limit switch into engagement with the solenoid contact 18t where the system is then prepared to repeat the cycle the next time the start button 10 is depressed.

The jog switch 104a may be closed manually at any time to override the remainder of the system. This becomes necessary when, for example, the weight becomes lodged in the material contained in the bin. In the absence of an override switch such as the switch 104a, the high limit switch 18r would automatically open at a predetermined tension in the tape and the weight W would remain lodged in the contents of the bin.

From the foregoing, it will be understood by those having ordinary skill in the art that various modifications of the components described herein may be made without departing from the spirit of the invention. By way of example rather than limitation, the tape T is preferably made of nylon, but other suitable material including steel tape may be employed; the weight W preferably has a predetermined shape and mass best suited for a controlled fall through air space and a subsequent encounter of a solid material. However, the weight may be made in any desired form and having any desired mass to best suit the environment in which it is employed. For example, if the level of a liquid is to be measured, the mass and shape of the weight W may be altered as necessary to produce the desired tape slack when the weight strikes the top of the liquid. It should also be apparent that the level detector of the present invention may also be used to detect the height of a different density layer in containers filled with liquid. The dimensions and mass of the weight in the latter situation would be suited for free fall through liquids with an appropirate tape slack being produced when a particular higher density layer within the liquid medium is encountered.

The foregoing disclosure and description of the invention are illustrative and explanatory thereof, and various changes in the size, shape, and materials as well as in the details of the illustrated construction may be made.

What is claimed is:
1. An automatic content level detector comprising:
   (a) spanning means for spanning the vertical distance between a first upper point and a second vertically spaced lower point;
   (b) retracting means for completely retracting said spanning means from between said first and second points;
   (c) sensing means for detecting a third transition point between said first and second points where a first density region meets a second higher density region;
   (d) indicator means for producing a depth reading corresponding to the position of said third transition point;
   (e) said spanning means including a measuring tape having a fixed end and a movable end with said movable end being free to move between said first and second points;
   (f) means for maintaining tension in said measuring tape as said tape moves downwardly between said first and second points;
   (g) said sensing means including an idler mechanism means for detecting a change in the tension of said measuring tape;
   (h) said movable end of said measuring tape being attached to a weight means for moving said tape downwardly between said first and second points;
   (i) said retracting means including a power means for providing rotating power;
   (j) a storage reel means for storing said measuring tape;
   (k) a clutch means mechanically linking said power means with said storage reel means;
   (l) a first switch means connected with said idler mechanism means for activating said power means when said idler means detects a decrease in the tension of said measuring tape;
   (m) a second switch means connected with said idler mechanism;
   (n) said second switch means having a first and second switching position with said first switching position being connected with said power means and said second switching position being connected with disengaging means for disengaging said clutch; and
   (o) a first mechanical linkage means for moving said second switch from said first switching position to said second switching position when said first switching means is moved from said on position to said off position.

2. The detector of claim 1 further including relay means connected between said first switch means and a start switch means for initiating initial operation of said detector.

3. An automatic content level detector comprising:
   (a) spanning means for spanning the vertical distance between a first upper point and a second vertically spaced lower point;
   (b) retracting means for completely retracting said spanning means from between said first and second points;
   (c) sensing means for detecting a third transition point between said first and second points where a first density region meets a second higher density region;
   (d) indicator means for producing a depth reading corresponding to the position of said third transition point;
   (e) said spanning means including a measuring tape having a fixed end and a movable end with said movable end being free to move between said first and second points;
   (f) means for maintaining tension in said measuring tape as said tape moves downwardly between said first and second points;
   (g) said sensing means including an idler mechanism means for detecting a change in the tension of said measuring tape;
   (h) said movable end of said measuring tape being attached to a weight means for moving said tape downwardly between said first and second points;
   (i) said idler mechanism including a cylinder mounted eccentrically in a yoke; and
   (j) said idler mechanism including means for adjusting the amount of tension required to operate said sensing means.

References Cited
UNITED STATES PATENTS

| | | | |
|---|---|---|---|
| 2,621,494 | 12/1952 | Cross. | |
| 2,704,401 | 3/1955 | Mohr et al. | 33—126.6 |
| 2,899,751 | 8/1959 | Mayes | 33—126.6 |
| 3,099,158 | 7/1963 | Barker | 73—321 |
| 3,148,429 | 9/1964 | Clift | 33—126.6 X |

WILLIAM D. MARTIN, Jr., Primary Examiner

U.S. Cl. X.R.
73—321; 192—90